J. W. Osgood
Pipe Coupling

Nº 8,096.  Patented May 20, 1851.

UNITED STATES PATENT OFFICE.

JAS. W. OSGOOD, OF COLUMBUS, OHIO.

COMPOUND COUPLING FOR HOSE OR PIPE.

Specification of Letters Patent No. 8,096, dated May 20, 1851.

*To all whom it may concern:*

Be it known that I, JAMES W. OSGOOD, of Columbus, in the county of Franklin and State of Ohio, have invented certain Improvements in Couplings for Connecting Hose or Pipe; and I do hereby declare, that the following is a full, clear, and exact description of the same, reference being had to the accompanying drawings, forming part of this specification, in which—

Figure 2:
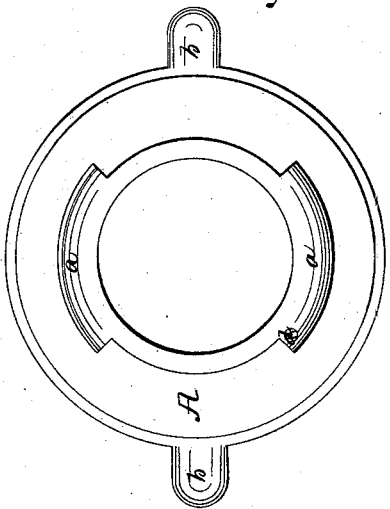
Figure 3:
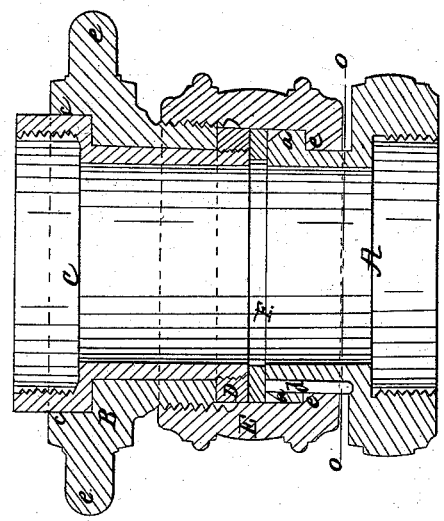
Figure 1:
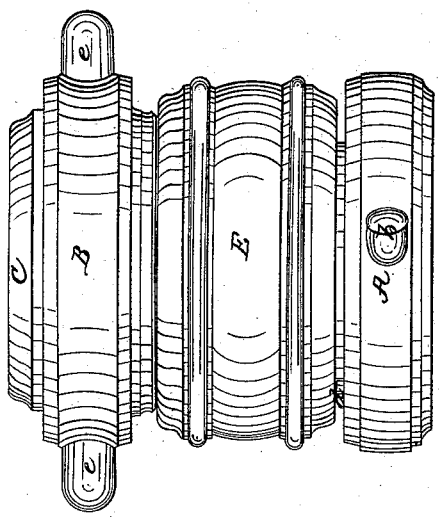
Figure 4:
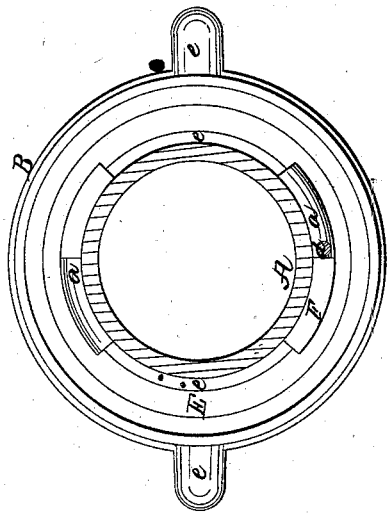

Figure 1 is a side elevation. Fig. 2 is a longitudinal section. Fig. 3 is an end detached view of the part marked A, seen from the inside, and Fig. 4 is a transverse section of the coupling taken in direction of the line *o o* Fig. 2, and viewed as indicated by arrow.

The same letters of reference denote similar parts throughout each of the several figures.

The nature of my invention consists in the rise of a box, into which one hose or pipe may screw or be fitted, formed with projecting lips, which enter between and lap inside corresponding lips projecting at one end from the interior of a connecting nut which has a female screw at its other end, into which screws a second box containing an interior box that may smoothly turn in it being of an enlarged diameter at its outer end which serves as a collar into which may screw or be fitted a second hose or pipe and the other end of the interior box having a screw cut upon it on to which screws a loose ring or collar that serves to keep the interior box from drawing out.

To enable others skilled in the art to make and use my invention, I will proceed to describe its construction and operation.

A, is one box forming the coupling, it consists in its length of two diameters, the part nearest the outer end being made larger with lugs or projections *b b*, for turning it by on its exterior, and a female screw in its interior at the mouth into which a hose or pipe may be screwed; the smaller end of the box A, has lips *a a*, projecting from it, each lip *a a*, forming as it were part of a flange, and a stop pin *d*, inserted near the end of one of them, running lengthwise with the box A.

B is a second box, also of different diameters having an annular space *c c*, at its mouth and lugs *e e*, for turning it by on its exterior, and a screw cut upon its inner or smaller end.

C is an interior box, likewise of two diameters, its mouth or larger end being of same diameter as the annular space *c c*, in the outer box B, into which it fits, and a female screw within it for attachment of a hose or pipe; and its inner or smaller end having a screw cut upon its extremity and being of same outside diameter as the bore of the box B.

D, is a loose ring or collar screwing on to the smaller end of the box C, and serving to keep the box C, from drawing out.

E, is a connecting nut one end of which screws on to the smaller end of the box B, and the other end formed with lips or part flanges *e e*, similar to the lips *a a*, of the box A, but projecting inward, and of length corresponding to (or rather less than) the spaces or distances between the lips *a a*, so as to enter between them; the bore of the nut E, being of same length in diameter as a chord measuring the distance between the outer circumferences of the lips *a a*; and the distance between the lips *e e*, being corresponding to the external diameter of the smaller end of the box A.

F, is a washer or ring of india rubber or other elastic material situated within the nut E, and inserted between the box A, interior box C, and ring D screwed upon the box C, it serves to keep the coupling tight or free from leakage when screwed up and locked.

The operation is as follows: Separate hose or pipe being screwed into or otherwise attached to the boxes A, C, the two holes or pipes (one of which if used for fire or other engines may be "leading" and the other the "suction" branch), may be united by inserting the lips *a a*, of the box to which the one hose or pipe is connected between the lips *e e*, of the nut E, and when inserted to the proper depth turning the box A, or nut E, until resisted by the stop *d*, so that the lips *a a*, will lap within or against the lips *e e*, and so lock the coupling the washer or ring F, preventing leakage or escape between the spaces left by the several lips and keeping the coupling tight which may be screwed and tightened up by turning the outer box B, which will revolve on the interior box C, and by drawing up the connecting nut E, will firmly unite the coupling without twisting or turning the hose or pipe, so that the coupling may be formed with little labor and loss of time, which offer great advantage where connections are required to be made and broken frequently and quickly, as for instance in coupling fire engine hose, where with the ordinary form of coupling the screws are liable to be damaged or clogged with dirt, thereby causing great delay, which is prevented by my improved construction, as the threads or screws are kept free from exposure to dirt or injury, and the connection quickly formed; the several screws, whether the coupling be joined or separated, being kept always united and hence protected; while by the screws being constantly in contact, the time consumed by the ordinary methods of attachment in establishing the coupling, will be considerably economized.

What I claim as my invention and desire to secure by Letters Patent, is:

The manner, if desired, of keeping the several threads or screws always in contact whether the coupling be formed or disconnected, for obtaining the advantages set forth, by employment of an interior box C, situate in an outer box B, and having a loose ring or collar D, (or its equivalent) on it, in combination with a washer F, connecting nut E, and box A, formed with lips for locking the coupling, the several parts constructed, fitting, and operating together substantially as shown and described.

JAMES W. OSGOOD.

Witnesses:
 Wm. Richards,
 J. L. McCullough.